United States Patent Office 3,711,263
Patented Jan. 16, 1973

3,711,263
SURFACE TREATMENT OF GLASS AND SIMILAR MATERIALS
Lucien Leger, Montignies-le-Tilleul, Belgium, assignor to Glaverbel S.A., Watermael-Boitsfort, Belgium
Filed June 27, 1969, Ser. No. 837,026
Claims priority, application Luxembourg, Sept. 12, 1968, 56,863
Int. Cl. C03c 21/00
U.S. Cl. 65—31                                23 Claims

ABSTRACT OF THE DISCLOSURE

A method and apparatus for treating an article which has been previously chemically tempered to place exterior layers under compressive stress, and the treated article itself, the treatment involving removing an 0.1 to 20 microns thick surface layer of compressively stressed material from the article.

BACKGROUND OF THE INVENTION

The present invention relates to a process for modifying a property of chemically tempered bodies made of glass, vitrocrystalline material, ceramic or stone, and to apparatus for use in the performance of such process.

It is known that the actual tensile strength of an article made of glass, vitrocrystalline material, ceramic or stone is invariably lower than that which the article should theoretically possess based on a consideration of its cross-sectional dimensions.

For instance, the actual tensile strength of a vitreous article of conventional composition, such as a soda-lime silicate glass, is approximately 6 kg./mm.². The strength which the same article should possess according to theoretical calculation is several hundred times higher than that actual value.

It is known that glass can be strengthened by causing a substance to enter the glass from a contacting medium and appropriately controlling the temperature during and after such entry so that exterior layers of the glass are placed in a state of compressive stress or of increased compressive stress. Such a process of setting up or increasing surface compressive stresses is known as chemical tempering.

Usually, chemical tempering involves the replacement of ions in the glass by ions deriving from the contacting treatment medium. It is possible for example to set up compressive stresses by replacing ions initially present in exterior layers of the glass by ions which confer a lower coefficient of thermal expansion on such exterior layers, the replacement being carried out at a temperature which is sufficiently high, and which is maintained for a time sufficiently long, for stress relaxation to occur, and by subsequently allowing the glass to cool.

Alternatively, surface compressive stresses can be set up by replacing ions initially present in exterior layers of the glass by larger ions while the surface layers of the glass are at an elevated temperature which is too low to allow substantial, or at least complete, stress relaxation to occur for the time during which such temperature is maintained, the glass being then cooled to ambient temperature so that the induced stresses are "frozen" in.

Furthermore, it is possible to introduce surface compressive stresses by causing ions to enter into the glass via a surface thereof from a contacting medium under the influence of an electric field, without an accompanying corresponding movement of ions from the glass into the contacting medium via that surface.

A chemical tempering process can be applied not only to a body of glass but also to a body of vitrocrystalline material. As applied to such a body, the tempering treatment gives the best results when the phase of the vitrocrystalline material which is susceptible to the greater, or greatest, amount of diffusion of a substance from the contacting medium is well dispersed throughout the surface of the body. A chemical tempering process can also be applied to a body of ceramic or stone, provided there is a sufficiently uniform distribution of a vitreous phase or phases at the surface of the material to permit surface compressive stresses to be set up or increased by the introduction or exchange of substances as referred to.

SUMMARY OF THE INVENTION

It is an object of the present invention to improve the properties of materials subjected to such a chemical tempering process. A more specific object of the invention is to provide a simple process whereby a property or properties of a body of glass, vitrocrystalline material, ceramic or stone which has been chemically tempered can be modified.

According to the present invention, this modification is brought about by subjecting the chemically tempered body to an after treatment composed of removing a surface layer of that part of the body which has been placed under compressive stress.

Since the strengthening of a body by chemical tempering is due to external layers of the body being placed in a state of compressive stress, it was not to be expected that partial removal of such layers would be beneficial. One would rather expect such removal to seriously weaken the body.

In fact, following the surface removal, the body, e.g. a sheet of glass, is found to be more strong. The effect of the surface removal according to the invention is therefore surprising.

DESCRIPTION OF THE PREFERRED EMBODIMENTS

Figure 1A:
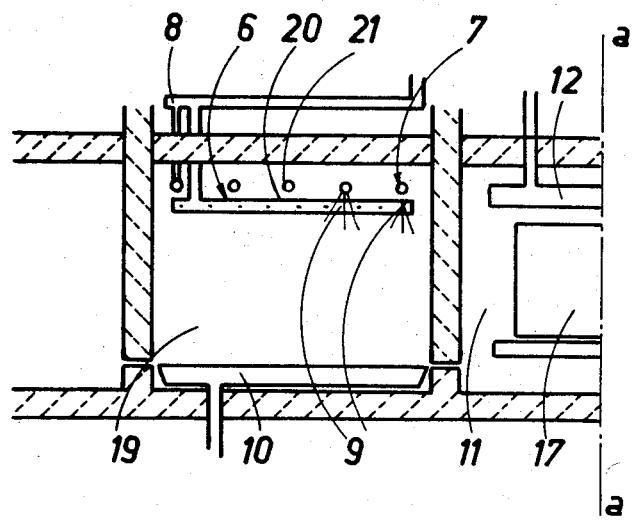
FIGS. 1a and 1b together constitute an elevational view of one embodiment of apparatus for carrying out the present invention.

The body treated in accordance with the invention may constitute a manufactured article. Alternatively the body may constitute part of an article, e.g. the body may be a coating on a substrate. In the latter case the compressive stresses due to chemical tempering may be confined to external layers at the exposed surface of the body.

The invention is particularly, but by no means exclusively, intended to be applied in the treatment of glass in sheet form. The invention can be applied to a sheet which has been chemically tempered over its whole area or to a sheet only a certain portion or portions of which has or have been chemically tempered, e.g., at the edges or marginal portions of the sheet where breakage can often commence. Even if the whole sheet has been chemically tempered, the treatment according to the invention whereby a surface layer is removed from that part which is under compressive stress may be confined to a portion or portions of the sheet, e.g., to edges or marginal portions thereof.

It has been found that it is advantageous for the ultimate strength of the body to remove a top layer of between 0.1 and 20 microns in thickness from the surface of each outer layer which is under compressive stress. Below this range the efficacy of the removal treatment is not so marked and above this range the resulting strength progressively diminishes as the thickness removed increases.

The removal of the surface layer is preferably performed by the action of a fluorine-containing medium. Fluorine-containing media are recommended because they enable the treatment to be performed very quickly.

Particularly when treating glass, it is preferable to use a fluorine-containing acid medium. If the medium used has sufficient acidity, the optical properties of the surface will not be impaired. Preferably the medium has a pH value of less than 4. Experiments show that transparent glass can be treated by such a medium without any loss in transparency, whereas if less acid media are used there is often a tendency for the glass surface to be rendered light-diffusing, which however for some applications is not unfavourable.

A very suitable treatment medium is an aqueous solution of hydrofluoric acid. Another suitable medium is ammonium bifluoride. As another example, a medium may be used which comprises a fluorine-containing compound, e.g., sodium fluoride (NaF) together with sulphuric acid. A particularly effective medium is one comprising both hydrofluoric acid and sulphuric acid. For instance, a satisfactory result has been obtained in a treatment period of only a few minutes by using an aqueous solution containing approximately 6% by volume of each of these acids.

While preference is given to fluorine-containing media, the removal of the surface layer can be achieved with solvent media. Thus, for example, a surface layer can be removed from the compressively stressed exterior layers of a chemically tempered glass body by using a medium containing OH ions, e.g., a solution of sodium hydroxide. When using a basic medium it is preferable for the medium in contact with the body to be continuously renewed to avoid impairment of the optical properties of the surface.

Preferably, the temperature of the treatment medium is between 0° C. and 80° C. The speed of removal of material from the surface of the body can be accurately controlled by an appropriate selection of the temperature within this range.

The treatment can advantageously be carried out by constantly renewing the treatment medium in contact with the surface of the body, for example by sprinkling or otherwise continuously supplying the latter with the medium and allowing the medium to stream along the surface to be treated. This method has the advantage of quickly renewing the medium, which becomes polluted by the reaction with the surface of the body. The same treatment can also be applied by means of a fluorinated compound in the form of a gas or a vapor.

An alternative way of performing the process is to dip the chemically tempered body into a bath of the treatment medium. Reaction products are simultaneously effectively removed from the surface being treated when the treatment is performed in this manner.

Advantageously, the treatment medium and the body are given a relative oscillatory movement at a sonic or ultrasonic frequency. It has been found that this movement accelerates the beneficial action of the treatment medium so that a given improvement in mechanical strength is thus obtained in a shorter time.

It is advantageous to follow the surface layer removal treatment by a treatment with water or a basic medium in cases were the removal has been obtained by other means than by basic media. The advantage of this lies in the fact that such after-treatment has been found to cause the strength of the body to be still further improved. The after-treatment may be performed by exposing the body to a humid atmosphere, e.g. an atmosphere which is saturated or near its saturation point, or by immersing the body in water or an aqueous solution of a base, e.g. sodium hydroxide, the after-treatment being continued for a sufficiently long time for strengthening effect to be produced. If a base is used, the reaction products are preferably continuously removed if the transparency of the material is to be preserved. The required after-treatment period can easily be ascertained by tests and of course depends in any given case on the composition of the treatment medium and its temperature. When treating ordinary soda-lime glass, good results have been obtained by an immersion in a bath consisting of a 20% aqueous solution of sodium hydroxide at 30° C.

The removal treatment whereby a surface stratum is removed from the compressively stressed exterior layers preferably takes place very soon after the chemical tempering, and preferably the process according to the invention is performed as part of a continuous process wherein bodies are successively chemically tempered, preferably by a process involving an exchange of alkali metal ions, and most preferably involving a replacement of alkali metal ions initially present in the body by larger alkali metal ions, and then subjected to the removal treatment. If an after-treatment with water or a base is performed, that treatment may likewise be carried out immediately after the preceding one. In the treatment of glass, preference is given to continuous processes wherein a chemical tempering treatment, involving an exchange of alkali metal ions between the glass and a contacting medium, is performed and wherein a surface layer is removed from the external compressively stressed layers within a few minutes after the termination of chemical tempering. By avoiding or reducing handling of the body between the tempering and the following removal treatment, the risk of the surface of the body being marred is likewise avoided or reduced.

After the removal treatment whereby a surface layer is removed following chemical tempering, and after the subsequent treatment with water or a base, if such after-treatment is applied, at least a portion of the treated surface of the body can be coated with one or more layers which modify a surface property of the body, e.g. its surface hardness. The improvement in tensile strength is considerably increased by the tempering and removal treatments but other properties, for example the surface hardness of the body are not necessarily improved by these treatments. It is therefore very advantageous to provide protection by applying one or more layers which confer improved mechanical properties on the body. For instance, there can be applied a hard layer or a layer with visco-elastic characteristics adequate to impart resilience to the surface in response to localized pressure. The improvement resulting from the application of the protecting layer or layers is greater than the improvement which would result from the application of the same layer or layers without carrying out previous tempering and removal treatments on the body.

The protective layer or layers can be deposited by different methods, for instance, by evaporation in vacuo, by cathode sputtering or else by applying the coating substance as a liquid, e.g. by dipping the body in a solution containing an organometallic substance, and then giving the film thus deposited a heat treatment. It is advantageous to apply one or more coating layers comprising at least one of the following substances: $TiO_2$, $SiO_2$, $Al_2O_3$, $Cr_2O_3$, $Fe_2O_3$, $ZrO_2$, $Ta_2O_5$, $V_2O_5$, $ThO_2$, $Y_2O_3$, $CeO_2$, ZnO, SiC, TiN, TaC, ZrC, $B_2C$, TiC, AlB, $B_4C$, zircon, beryl, topaz, $ZnCrO_4$ and $ZrB_2$. Layers formed from these compounds have considerable hardness. Advantageously, the tempering, removal and coating treatments are performed successively in a continuous process wherein any contact between the body and other bodies between the removal and the coating treatments is reduced to a minimum.

Preferably, the treatments are performed in an apparatus comprising means for spraying removal medium, a tank for collecting the medium after it has streamed along the body, and means for supporting the body to be treated in the zone of action of the spraying means. Such apparatus enables the removal liquid in contact with the surface of the body to be continually renewed and also enables the solution to be collected after it has streamed over the body. Advantageously, the apparatus also comprises means for spraying or sprinkling medium required for the ion exchange treatment substance and a tank for collecting this medium after it has streamed over the body. Such an apparatus enables the treatments by the removal medium and by the ion exchange treatment medium to be performed in a continuous process.

Advantageously, each collecting tank is connected to a recycling circuit which recycles the liquid back to the sprinklers or sprayers for re-use. The apparatus may incorporate means for filtering and/or regenerating the media during recycling thereof.

The performance of a process according to the invention using a fluorine-containing removal medium can be monitored by examination of the body itself. If an ion exchange involving replacement of ions in the body by other ions has taken place, these other ions will be present in a greater concentration in external layers of the body, and in a surface layer of such external layers the body will contain fluorine ions. For example, in the case of a body which has been chemically tempered by an ion exchange between sodium ions in the glass and potassium ions in a contacting medium, the body, after the subsequent removal treatment, is characterised in that it contains sodium ions and, in exterior layers of the body, potassium ions in a concentration greater than in internal layers of the body, where the concentration of potassium ions may be nil, and in that there are fluorine ions in a surface layer of such exterior layers. The actual surface of such a body is hydrophobic.

The invention also includes a body having such characteristics.

The invention will now be illustrated by a number of non-limitative examples. In all these examples the thickness of the surface stratum layer was determined by measuring the loss of weight of material as a result of the removal treatment.

Example I

A sheet of vitrocrystalline material produced from the following constituents, by weight:

|  | Percent |
|---|---|
| $SiO_2$ | 48 |
| $Al_2O_3$ | 32 |
| $Na_2O$ | 10 |
| CaO | 2 |
| $TiO_2$ | 8 | was chemically tempered for 24 hours at 520° C. in a bath of potassium nitrate. The resulting breakage strength was 80 kg./mm.$^2$—about four times higher than that before the tempering treatment.

A sheet having the same composition was given an identical chemical temperaing treatment and, for removing a surface layer of the sheet, was then immersed at 20° C. in an etching bath having the following composition:

8.8 liters of water
0.6 liter $H_2SO_4$
0.6 liter HF (70%)

The etching treatment lasted for 3 minutes and resulted in the removal of a surface layer 2 microns thick from each side of the sheet. The breakage strength of the sheet, determined by flexure, was 110 kg./mm.$^2$. By lengthening the acid treatment to 20 minutes, surface layers 14 microns in thickness were removed and the breakage strength was given a value of only 94 kg./mm.$^2$.

In a comparative test, a breakage strength comparable to that possessed by the sheet treated with acid for 3 minutes as above-described was obtained by treating a similar sheet with the acid for one minute at 20° C., accompanied by mechanical vibrations at a frequency of 45 cycles/sec. and a power of 2 watt/cm.$^2$. In this case, however, only 0.9 micron of material was removed from the surface.

Example II

A sheet of soda-lime glass formed from the following main constituents:

|  | Percent |
|---|---|
| $SiO_2$ | 71 |
| $Al_2O_3$ | 2 |
| $Na_2O$ | 13 |
| CaO | 12 | was given an ion exchange chemical tempering treatment. $Na^+$ ions were replaced by $Li^+$ ions in a bath containing 2% $LiNO_3$ and 98% $NaNO_3$ at a temperature of 580° C. The tempering treatment lasted for 20 minutes. The glass was removed from the bath, cooled and dried. The glass was then placed in an aqueous solution containing 10% by volume of hydrofluoric acid, kept at 50° C. After a treatment lasting 30 seconds, the glass was removed from the acid bath, washed with distilled water and dried in isopropylic alcohol vapor. A thickness of 3 microns had been removed from each surface by the acid treatment. The breakage strength was 45 kg./mm.$^2$. Before treatment in the acid bath, the breakage strength was only 15 kg./mm.$^2$. The treated sheet was somewhat light-diffusing.

Example III

A sheet of soda-lime glass was given an ion exchange tempering treatment in a bath of $KNO_3$. As a result of the tempering, surface layers of the glass 25 microns in thickness were in a state of compression and the tensile strength of the glass was 100 kg./mm.$^2$. The glass was given a treatment in the acid bath used in Example I for 2 minutes. A surface stratum 2 microns in thickness was removed from each side of the sheet by this treatment. The resulting glass had a tensile strength of 130 kg./mm.$^2$.

A layer of $ZrO_2$ was then deposited on a sample of the treated glass by immersing it in an alcoholic solution of the corresponding acetate and then heat treating the coating film thus formed at 300° C. The tensile strength had slightly diminished, but the surface hardness was better than before the coating step.

Example IV

Figure 1B:
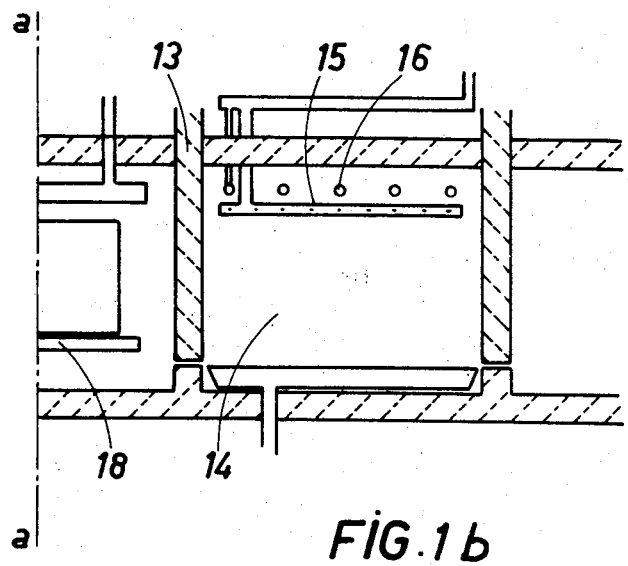

FIGS. 1a and 1b show diagrammatically an apparatus enabling the ion exchange and acid treatments to be carried out in a continuous process.

A sheet of glass 17 is disposed vertically on a support 18 which is advanced by a mechanism (not shown), e.g. a chain or carriage. In a first compartment 19, the sheet of glass is heated to the working temperature of the ion exchange treatment—i.e., 450° C.—by means of radiant elements (not shown). In the same compartment 19, sprayers or sprinkler pipes 20 and 21 orientated transversely to one another and provided with holes 6 and 7, respectively, are connected to a conduit 8 for feeding molten potassium nitrate. The glass 17 is thus sprayed over all of its surfaces by jets or streams 9 of the ion exchange salt. The ion exchange treatment is continued for 24 hours and the salt used is collected at the bottom of the compartment 19 in a gutter 10 which conveys the salt to a regenerator and a recycler (not shown).

After this treatment, the glass is kept in an adjacent compartment 11 for one hour at a temperature of 450° C. to allow the salt to drain completely away. The glass is then cooled in the same compartment by means of coolers 12. When the glass reaches a temperature of 50° C., the partition 13 is raised and the glass 17 is conveyed into a compartment 14 constructed similarly to the compartment 19.

In the compartment 14 the acid medium material removal treatment is performed by spraying the sheet by means of spray or sprinkler pipes 15 and 16. The acid mixture consisting of hydrofluoric acid and sulphuric acid is sprayed on to the surfaces of the glass for one minute. The glass is then cooled and is thus ready for coating with a protective layer is required. The acid treatment removes a layer 2.5 microns in thickness from each side of the glass sheet.

By the treatment above described the tensile strength of the glass was increased to 120 kg./mm.$^2$ compared with a value of 90 kg./mm.$^2$ which would be obtained if the treatment were halted after the ion exchange step. In a comparative test in which a similar sheet was subjected to a similar treatment, but in a discontinuous manner, the sheet surface being handled after the chemical tempering and before the acid treatment, the tensile strength was increased only to 105 kg./mm.$^2$.

Example V

A piece of ceramic formed from the following composition:

|  | Percent |
|---|---|
| $Al_2O_3$ | 40 |
| $SiO_2$ | 55 |
| $Na_2O$ | 0.5 |
| CaO, MgO; $Fe_2O_3$, $TiO_2$ | 4.5 | was immersed in a bath of $KNO_3$ at 450° C. for 48 hours. After the chemical tempering, the piece was treated with an aqueous solution of sulphuric acid and hydrofluoric acid whereby a surface layer 12 microns in thickness was removed from the exterior layers in a state of compressive stress. The piece was found to have acquired a tensile strength twice that which it had before the acid removal treatment.

Example VI

A sheet of soda-lime glass was treated for 40 hours in a bath of $KNO_3$ containing 0.2% of $K_2CO_3$. The bath was maintained at 450° C. The tensile strength of the sheet after that treatment was 90 kg./mm.$^2$. Potassium ions had penetrated up to 30 microns into the sheet. In a comparative test, a sheet of the same glass was subjected to the same chemical tempering treatment and was then immersed for one hour in a 20% aqueous solution of NaOH at 30° C. The tensile strength of the glass after that treatment was 110 kg./mm.$^2$. A surface layer 1.5 microns in thickness was removed from the surface of the glass sheet, on each side thereof, by this treatment.

Example VII

A piece of nepheline ($Na_3KAl_4Si_4O_{16}$) was subjected to an ion exchange treatment in a bath of $KNO_3$ at 500° C. After 30 hours the sample was withdrawn from the bath, cooled and then immersed for three minutes in an acid medium containing 6% by volume of HF. The acid treatment removed a surface layer from the compressively stressed surface layer of the mineral and the strength of the piece was considerably increased by such treatment.

Example VIII

Sheets of soda-lime glass were tempered by immersion for twenty hours in a bath of $KNO_3$ at 470° C. followed by cooling of the sheets. The tensile strength of the tempered sheets was 90 kg./mm.$^2$.

The chemically tempered sheets were sprinkled for 2 minutes with an aqueous solution containing 6% HF and 6% $H_2SO_4$, the temperature of the solution being 20° C. This treatment removed from each side of each sheet a surface layer 1.5 microns in thickness. Following this treatment the sheets had a tensile strength of 115 kg./mm.$^2$.

The sheets were then immersed for 5 minutes in boiling water. This final treatment increased the tensile strength of the sheets to 135 kg./mm.$^2$.

It will be understood that the above description of the present invention is susceptible to various modifications, changes and adaptations.

I claim:

1. A process for modifying a property of a body of glass, vitrocrystalline material, ceramic or stone at least a part of which body has been previously chemically tempered to place an external layer thereof under compressive stress, comprising removing a portion of said external layer from the part which has been placed under compressive stress.

2. A process as defined in claim 1 wherein the body constitutes a manufactured article.

3. A process as defined in claim 1 wherein said step of removing is carried out to remove a layer of from 0.1 to 20 microns in thickness.

4. A process as defined in claim 1 wherein said step of removing is carried out by applying a medium containing fluorine.

5. A process as defined in claim 4 wherein the medium has a pH less than 4.

6. A process as defined in claim 4 wherein the medium contains hydrofluoric acid in aqueous solution.

7. A process as defined in claim 4 wherein the medium contains sulphuric acid.

8. A process as defined in claim 4 wherein said step of removing is carried out at a temperature between 0° and 80° C.

9. A process as defined in claim 4 comprising the further step, after said step of removing, of treating the body with an aqueous medium.

10. A process as defined in claim 4 comprising the further step, after said step of removing, of treating the body with an alkaline medium.

11. A process as defined in claim 10 wherein the alkaline medium contains NaOH.

12. A process as defined in claim 1 comprising the further step, after said step of removing, of immersing the body in water at a predetermined temperature and for a predetermined period of time such that the strength of the body is increased.

13. A process as defined in claim 1 comprising the further step, after said step of removing, of exposing the body to a humid atmosphere at a predetermined temperature and for a predetermined period of time such that the strength of the body is increased.

14. A process as defined in claim 1 wherein said step of removing is carried out by means of a medium which is continuously supplied to and streams along the body.

15. A process as defined in claim 1 wherein said step of removing is carried out by immersing the body in a liquid medium which removes such layer.

16. A process as defined in claim 1 wherein said step of removing is carried out by applying to the body a material removal medium and by producing between the body and the medium a relative oscillatory movement at a sonic or ultrasonic frequency.

17. A process as defined in claim 1 wherein the body has been previously subjected to a chemical tempering treatment involving an ion exchange between ions in the body and larger ions from a contacting substance.

18. A process as defined in claim 17 wherein the exchanged ions are alkali metal ions.

19. A process as defined in claim 1 wherein said step of removing is carried out immediately following the chemical tempering of the body.

20. A process as defined in claim 1 further comprising, after said step of removing, coating at least a portion of the previously treated surface of the body with at least one layer which imparts a modified surface property to the body.

21. A process as defined in claim 20 wherein said step of coating is carried out by applying a layer composed of at least one substance selected from the group consisting of $TiO_2$, $SiO_2$, $Al_2O_3$, $Cr_2O_3$, $Fe_2O_3$, $ZrO_2$, $Ta_2O_5$, $V_2O_5$, $ThO_2$, $Y_2O_3$, $CeO_2$, ZnO, SiC, TiN, TaC, ZrC, $B_2C$, TiC, AlB, $B_4C$, zircon, beryl, topaz, $ZnCrO_4$ and $ZrB_2$.

22. A process as defined in claim 1 wherein the chemical tempering and the step of removing are performed successively in a continuous process.

23. A process as defined in claim 1 wherein the body is constituted by a sheet of glass.

References Cited

UNITED STATES PATENTS

| | | | |
|---|---|---|---|
| 928,860 | 7/1909 | Farling | 65—31 |
| 3,301,649 | 1/1967 | Marusak | 65—30 |
| 3,317,297 | 5/1967 | Ray | 65—31 X |
| 3,149,946 | 9/1964 | Elmer | 65—31 X |
| 2,303,749 | 1/1942 | Long | 65—114 |
| 3,410,736 | 11/1968 | Tokuyama et al. | 148—186 |

FOREIGN PATENTS

| | | | |
|---|---|---|---|
| 451,656 | 10/1948 | Canada | 65—31 |
| 1,375,368 | 9/1964 | France | 65—31 |

ARTHUR D. KELLOGG, Primary Examiner

U.S. Cl. X.R.

65—114, 116